United States Patent
Kitazawa (10) Patent No.: US 12,511,012 B2
(45) Date of Patent: Dec. 30, 2025

(54) INFORMATION PROCESSING APPARATUS, INFORMATION PROCESSING METHOD, AND NON-TRANSITORY COMPUTER READABLE MEDIUM STORING PROGRAM

(71) Applicant: FUJIFILM Business Innovation Corp., Tokyo (JP)

(72) Inventor: Yuka Kitazawa, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 504 days.

(21) Appl. No.: 17/886,922

(22) Filed: Aug. 12, 2022

(65) Prior Publication Data

US 2023/0289033 A1    Sep. 14, 2023

(30) Foreign Application Priority Data

Mar. 11, 2022 (JP) ................. 2022-038293

(51) Int. Cl.
G06F 3/048 (2013.01)
G06F 3/04817 (2022.01)
G06F 3/04842 (2022.01)
G06F 3/04847 (2022.01)
G06F 16/16 (2019.01)

(52) U.S. Cl.
CPC ...... *G06F 3/04817* (2013.01); *G06F 3/04842* (2013.01); *G06F 3/04847* (2013.01); *G06F 16/168* (2019.01)

(58) Field of Classification Search
CPC ............. G06F 3/04817; G06F 3/04842; G06F 3/04847; G06F 16/168; G06Q 10/10
See application file for complete search history.

(56) References Cited

U.S. PATENT DOCUMENTS

| | | | |
|---|---|---|---|
| 5,918,226 A | 6/1999 | Tarumi et al. | |
| 2007/0266093 A1* | 11/2007 | Forstall | G06F 9/451 715/764 |
| 2008/0235603 A1 | 9/2008 | Holm et al. | |
| 2012/0096389 A1* | 4/2012 | Flam | G06F 16/168 715/777 |
| 2014/0351817 A1 | 11/2014 | Sawamura | |
| 2015/0350827 A1* | 12/2015 | Birch | H04W 4/021 455/456.1 |
| 2017/0054861 A1* | 2/2017 | Dejoras | G06F 3/1271 |
| 2021/0042024 A1 | 2/2021 | Tsumemitsu | |
| 2023/0418455 A1 | 12/2023 | Tsumemitsu | |

FOREIGN PATENT DOCUMENTS

| | | |
|---|---|---|
| JP | H08-190584 A | 7/1996 |
| JP | 2003-015923 A | 1/2003 |
| JP | 4146690 B2 | 9/2008 |

OTHER PUBLICATIONS

Jan. 2, 2023, Search Report Issued in European Patent Application No. EP 22192550.6.
Nov. 24, 2025 Office Action issued in European Patent Application No. 22192550.6.

* cited by examiner

*Primary Examiner* — Thanh T Vu
(74) *Attorney, Agent, or Firm* — Oliff PLC (57) ABSTRACT

An information processing apparatus includes a processor configured to: cause a display to display a folder associated with a workflow; and cause the display to display a status of the workflow in response to selection of the folder by a user.

12 Claims, 10 Drawing Sheets

INFORMATION PROCESSING APPARATUS, INFORMATION PROCESSING METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2022-038293 filed Mar. 11, 2022.

BACKGROUND

(i) Technical Field

The present disclosure relates to an information processing apparatus, an information processing method, and a non-transitory computer readable medium storing a program.

(ii) Related Art

There has been used a workflow that predefines processing operations of a series of processes on electronic data. By entering the electronic data into the workflow (execution of an electronic document in a workflow may be referred to herein as "enter an electronic document into a workflow"), the electronic data may be processed in accordance with the workflow.

Japanese Unexamined Patent Application Publication No. 8-190584 discloses a workflow system that predicts future progress of a workflow based on conditions related to the workflow, the status of the workflow, and information related to tasks of operators. Japanese Unexamined Patent Application Publication No. 2003-15923 discloses a computer system that displays information related to an image file displayed on a monitor screen in response to selection of the image file with a mouse cursor.

SUMMARY

Aspects of non-limiting embodiments of the present disclosure relate to the following circumstances. A folder may be associated with a workflow. The associated folder stores electronic data input to the workflow. For example, one workflow may be associated with a plurality of folders. In this case, electronic data moves from one associated folder to another as the processes in the workflow proceed. In other cases, one folder may be associated with a plurality of workflows.

A folder associated with a workflow may be displayed on a display. In this case, a user may want to grasp the status of the associated workflow (a plurality of workflows may be associated as described above).

It is appropriate that the user may grasp the status of the workflow associated with the displayed folder.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: cause a display to display a folder associated with a workflow; and cause the display to display a status of the workflow in response to selection of the folder by a user.

BRIEF DESCRIPTION OF THE DRAWINGS

An exemplary embodiment of the present disclosure will be described in detail based on the following figures, wherein.

DETAILED DESCRIPTION

Figure 1:
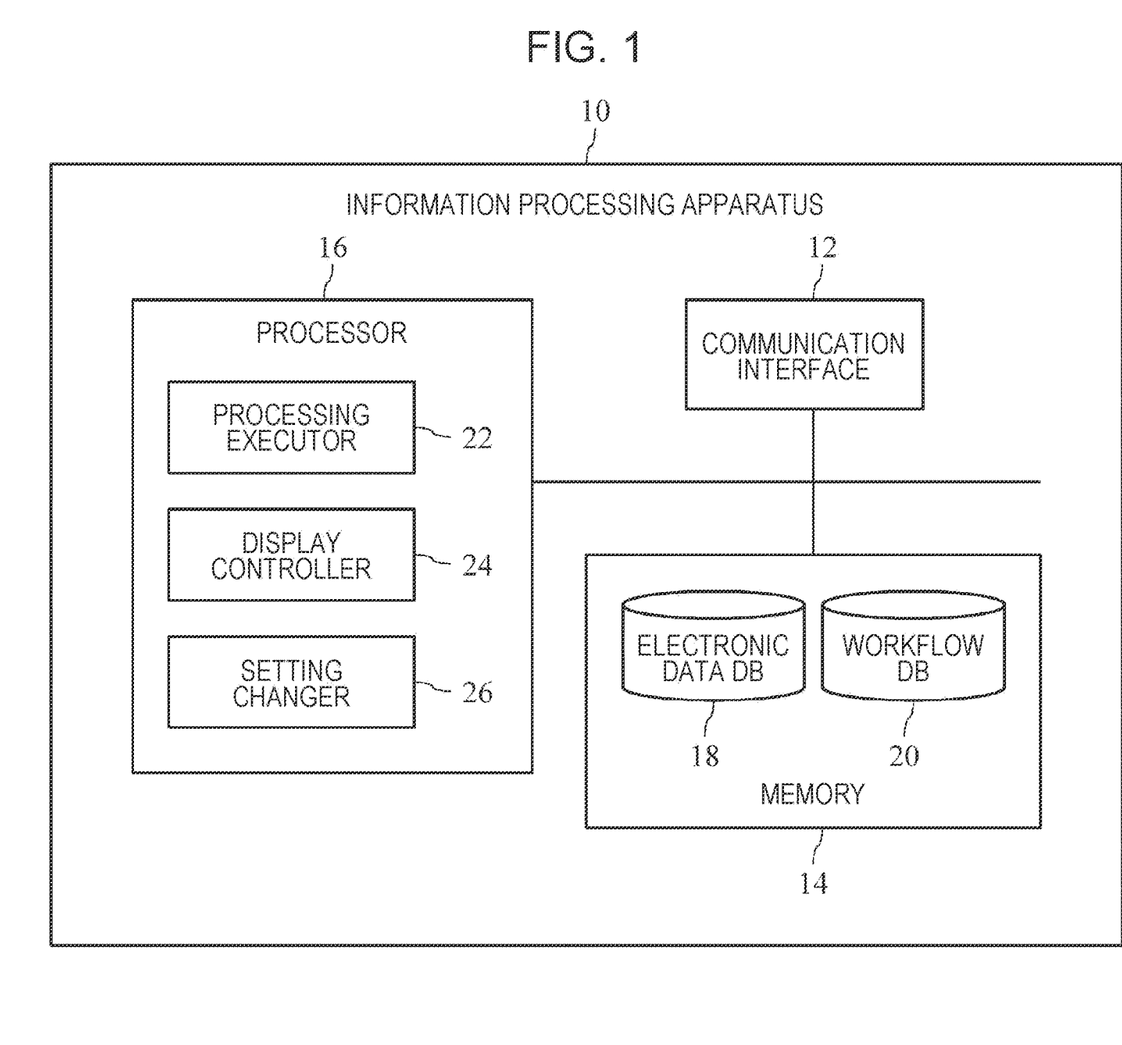
FIG. 1 illustrates the configuration of an information processing apparatus according to an exemplary embodiment.

FIG. 1 illustrates the configuration of an information processing apparatus 10 according to an exemplary embodiment. The information processing apparatus 10 according to this exemplary embodiment is a server that provides a data management service for electronic data. In the data management service, for example, electronic data received from users is managed in a database, and the managed electronic data is provided to the users in response to users' request. In the data management service, various processes may be executed on the managed electronic data. The electronic data is typically an electronic document, but is not limited to the electronic document, and may be, for example, image data or program data.

Although details are described later, workflows may be defined in the data management service according to this exemplary embodiment. Each workflow includes preset processing operations of a series of processes on electronic data. The users may process the electronic data in accordance with the defined workflows. The users may set the processing operations of the processes in the workflows.

As long as functions described below may be exerted (in other words, an electronic data providing service described below may be provided), the information processing apparatus 10 is not limited to the server, and may be constituted by various computers. The functions of the information processing apparatus 10 described below may be implemented by cooperation of a plurality of computers.

As illustrated in FIG. 1, the information processing apparatus 10 according to this exemplary embodiment includes a communication interface 12, a memory 14, and a processor 16. If the information processing apparatus 10 is a personal computer or a tablet terminal, the information processing apparatus 10 may further include a display that displays various screens (e.g., liquid crystal panel) or an input interface to be used for inputting user's instructions (e.g., mouse or touch panel).

Examples of the communication interface 12 include a network interface card (NIC). The communication interface 12 exerts a function of communicating with other apparatuses via a communication network such as a local area network (LAN) or the Internet. Since the information processing apparatus 10 is the server in this exemplary embodiment, the communication interface 12 is accessed by a user terminal (e.g., personal computer or tablet terminal) of a user who wants to obtain the data management service. The communication interface 12 transmits, to the user terminal, screen information for displaying various screens on a display of the user terminal and electronic data managed in the data management service.

The memory 14 includes a hard disk drive (HDD), a solid state drive (SSD), an embedded multimedia card (eMMC), a read only memory (ROM), or a random access memory (RAM). The memory 14 stores an information processing program for operating individual components of the information processing apparatus 10. The information processing program may be stored in a non-transitory computer readable storage medium such as a universal serial bus (USB) memory or a CD-ROM. The information processing apparatus 10 may read and execute the information processing program in the storage medium. The memory 14 stores a user database (DB) (not illustrated) in which user IDs for uniquely identifying the users registered in the data management service are associated with authentication information (e.g., passwords).

As illustrated in FIG. 1, the memory 14 stores an electronic data DB 18 and a workflow DB 20.

The electronic data DB 18 stores electronic data managed in the information processing apparatus 10, that is, the data management service, and attribute information of the electronic data. In the electronic data DB 18 of this exemplary embodiment, a plurality of folders that store the electronic data are defined and each piece of electronic data is stored in the electronic data DB 18 by being stored in the folder. Examples of the attribute information of the electronic data include, but not limited to, information indicating the name of the electronic data, an extension (data format), a data amount, a user ID of a user who has uploaded the electronic data in the data management service, and a date of upload in the data management service.

In particular, the attribute information of electronic data currently subjected to processes related to a workflow (details are described later) includes information indicating the workflow. Examples of the information indicating the workflow include information for identifying the workflow into which the electronic data has been entered, and a user ID for identifying a user who has entered the electronic data into the workflow. In other words, the electronic data stored in the electronic data DB 18 includes electronic data associated with the workflow in which the processes are currently executed on the electronic data.

The workflow DB 20 stores information related to each workflow. The information related to the workflow includes information indicating settings of the workflow and information indicating the status of the workflow.

The settings of the workflow include the structure of the workflow. The structure of the workflow indicates processing operations of processes to be sequentially executed on electronic data, and the order of the processes. The workflow may include a plurality of processes to be executed in series, or processes to be executed in parallel. The workflow of this exemplary embodiment may include a single process.

Figure 2:
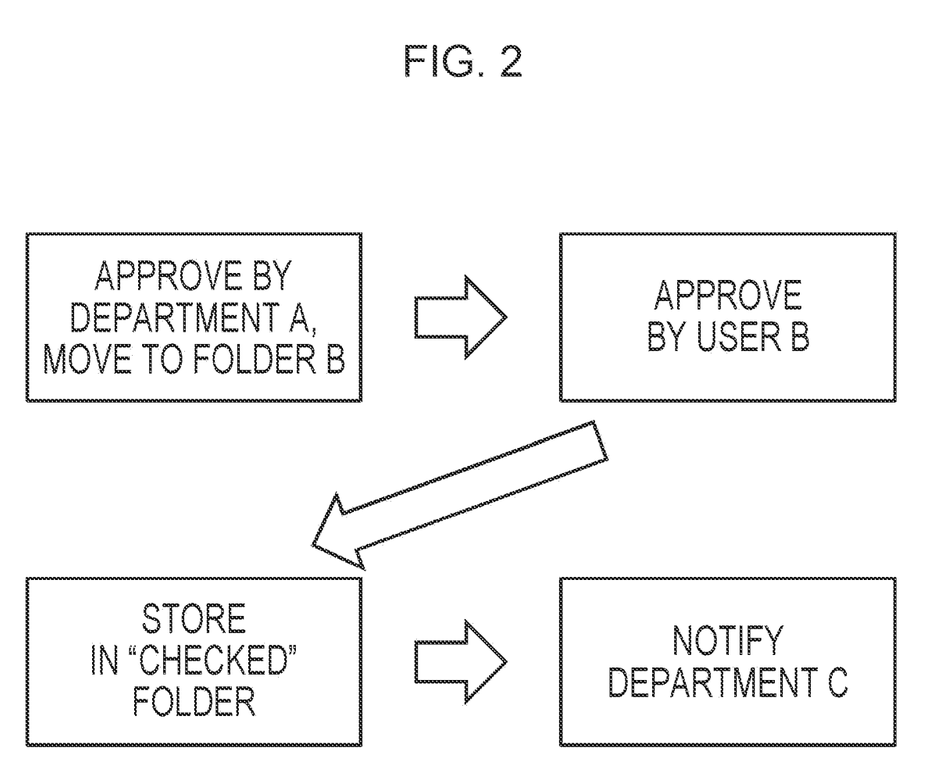
FIG. 2 illustrates an example of the structure of a workflow.

FIG. 2 illustrates an example of the structure of the workflow. In the workflow illustrated in FIG. 2, "Approve by department A, move to folder B" is defined as a first process (process to be executed firstly), "Approve by user B" is defined as a second process to be executed after completion of the first process (process to be executed secondly), "Store in "checked" folder" is defined as a third process to be executed after completion of the second process (process to be executed thirdly), and "Notify department C" is defined as a fourth process to be executed after completion of the third process (process to be executed fourthly).

Since such a workflow is defined in advance, the user may process electronic document in accordance with the workflow by entering the electronic document into the workflow.

The settings of the workflow include the processing operations of the processes in the workflow. For example, the settings of the workflow include the processing operation "Approve by department A, move to folder B" of the first process in the workflow illustrated in FIG. 2.

As in the first and third processes in the workflow illustrated in FIG. 2, folders defined in the electronic data DB 18 may be associated with the processes in the workflow. For example, the folder B is associated with the first process in the workflow illustrated in FIG. 2, and the "checked" folder is associated with the third process. In this manner, one or more folders may be associated with the workflow. In other words, the folders defined in the electronic data DB 18 include a folder associated with a specific workflow. One folder may be associated with a plurality of workflows. In other words, a plurality of workflows may use the same folder.

In general, electronic data entered into a workflow is stored in a folder associated with a process in the workflow. If folders are associated with a plurality of processes in the workflow, the electronic data entered into the workflow moves between the folders as the processes in the workflow proceed. For example, in the workflow illustrated in FIG. 2, the electronic data is stored in the folder B in the first process, and is stored in the "checked" folder from the folder B in the third process.

In the case where the folders are associated with the processes in the workflow, the settings of the workflow include the folders associated with the processes in the workflow.

The status of the workflow is a status of each electronic document entered into the workflow. For example, the status indicates which process has been completed on each electronic document among the processes defined in the workflow, or which folder defined in the workflow stores each electronic document.

As illustrated in FIG. 1, the processor 16 functions as a processing executor 22, a display controller 24, and a setting changer 26 based on the information processing program stored in the memory 14.

The processing executor 22 executes various processes related to the data management service. For example, in response to access to the data management service from a user terminal of a user, the processing executor 22 authenticates the user by a predetermined method (e.g., input of a user ID and a password). Then, the processing executor 22 executes a process on electronic data managed in the data management service based on the user's instruction. For example, the processing executor 22 stores electronic data from the user terminal into a folder in the electronic data DB 18 in response to the user's instruction. In response to the user's request, the processing executor 22 executes a process on electronic data stored in the electronic data DB 18, or transmits the electronic data to the user terminal of the user.

In particular, the processing executor 22 executes, in the data management service, a process related to electronic data in accordance with a workflow defined in the workflow DB 20. For example, in response to a user's instruction to enter predetermined electronic data (may be electronic data stored in the electronic data DB 18 or electronic data newly transmitted from a user terminal) into a certain workflow, the processing executor 22 refers to the workflow DB 20 to obtain settings of the workflow (e.g., structure, processing operation, and folder) under the user's instruction, and executes a process on the predetermined electronic data in accordance with the workflow.

The display controller 24 executes a process of causing the display to display screens related to the data management service. Since the information processing apparatus 10 is the server in this exemplary embodiment, the display controller 24 causes a display of a user terminal of a user accessing the data management service to display the screens related to the data management service. If the information processing apparatus 10 is a personal computer or a tablet terminal including a display, the display controller 24 may cause the display of the information processing apparatus 10 to display the screens related to the data management service.

The setting changer 26 executes a process of changing settings of a workflow defined in the workflow DB 20 based on a user's instruction.

Details of the processes to be performed by the processing executor 22, the display controller 24, and the setting changer 26 are described with reference to FIG. 3 to FIG. 10 as appropriate.

Figure 3:
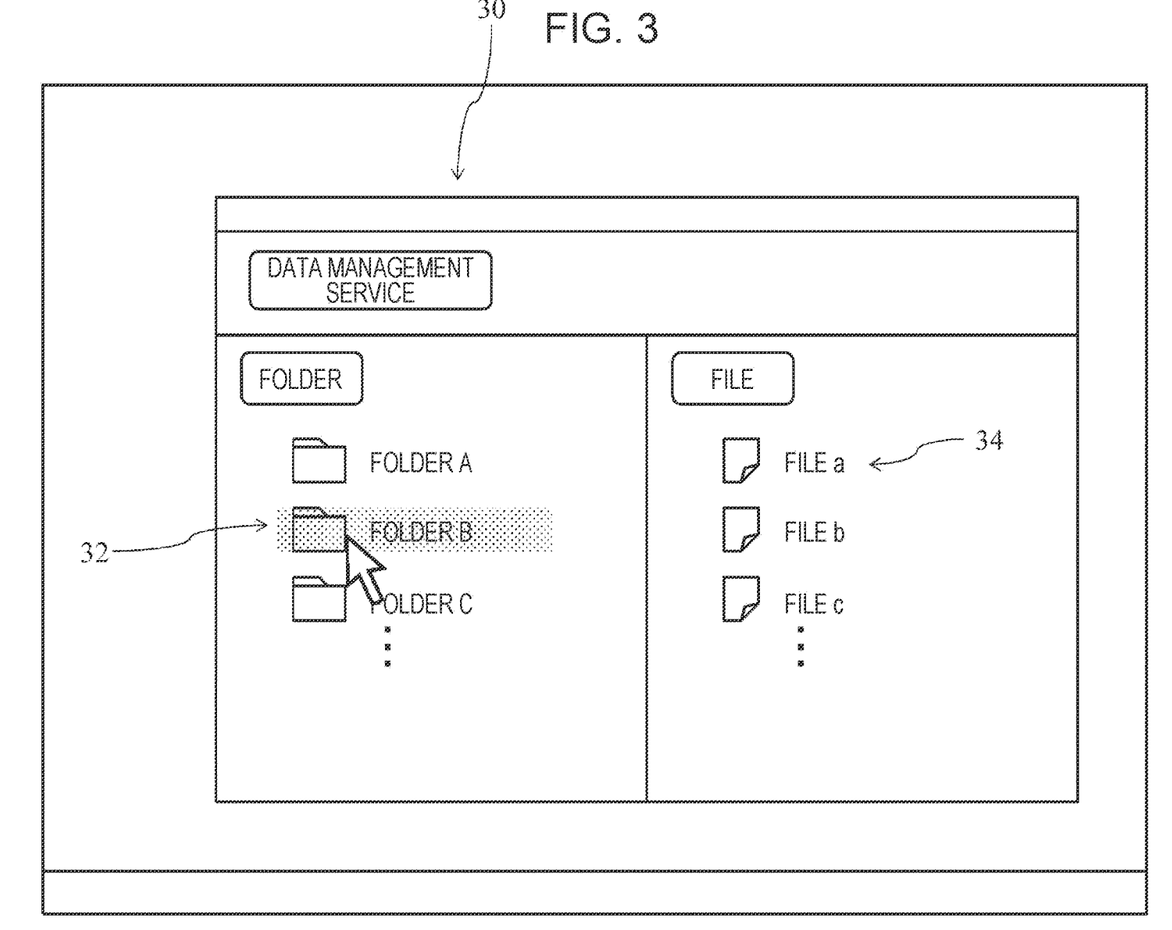
FIG. 3 illustrates an example of a screen related to a data management service.

FIG. 3 illustrates an example of a screen related to the data management service and displayed on the display of the user terminal by the display controller 24. In this exemplary embodiment, the display controller 24 causes the display of the user terminal to display a data management service window 30 showing contents of the data management service as illustrated in FIG. 3. The data management service window 30 shows folder icons 32 indicating folders defined in the electronic data DB 18, and data icons 34 indicating pieces of electronic data stored in the electronic data DB 18 (e.g., data icons corresponding to pieces of data stored in a specific folder). The screen showing such contents may be an initial screen to be displayed first in response to the access to the data management service from the user.

The contents in the data management service window 30 illustrated in FIG. 3 are an example of the screen provided from the data management service (i.e., the screen displayed by the display controller 24), and the data management service window 30 may show various screens in response to user's instructions. For example, in response to the user's instructions, the data management service window 30 may show a list of workflows defined in the workflow DB 20 and a screen showing settings of each workflow.

If a folder icon 32 indicating a folder defined in the electronic data DB 18 is displayed as in the data management service window 30, the user of the data management service may want to view, regarding the folder as a reference point, the statuses of one or more workflows associated with the folder. To view the status of a workflow, the user generally performs a series of actions described below. In the data management service window 30, the user performs an action for displaying a list of workflows, selects a desired workflow, and performs an action for displaying a screen showing the status of the selected workflow. In this manner, the user may view the status of the workflow. In this method, however, it is difficult to easily grasp the statuses of one or more workflows associated with the currently displayed folder icon 32. In this method, the status of the workflow is displayed with time and effort. In this exemplary embodiment, the user may (easily) view the status of the workflow associated with the folder displayed on the screen. Details of the process are described below.

In response to selection of a folder displayed in the data management service window 30 by the user, the display controller 24 causes the display of the user terminal of the user to display the status of a workflow associated with the folder.

Referring to FIG. 3, the folder B is associated with a certain workflow. Selection of a folder icon 32 corresponding to the folder B by the user corresponds to selection of the folder B by the user. In this exemplary embodiment, as illustrated in FIG. 3, the user selects the folder B by placing, on the folder icon 32 corresponding to the folder B, a cursor moving on the screen by a user's action such as a mouse action. The folder icon 32 corresponding to the folder B is not only the folder object but may also be an area including the folder name displayed on the side. The method for selecting the folder by the user is not limited to this method.

Figure 4:
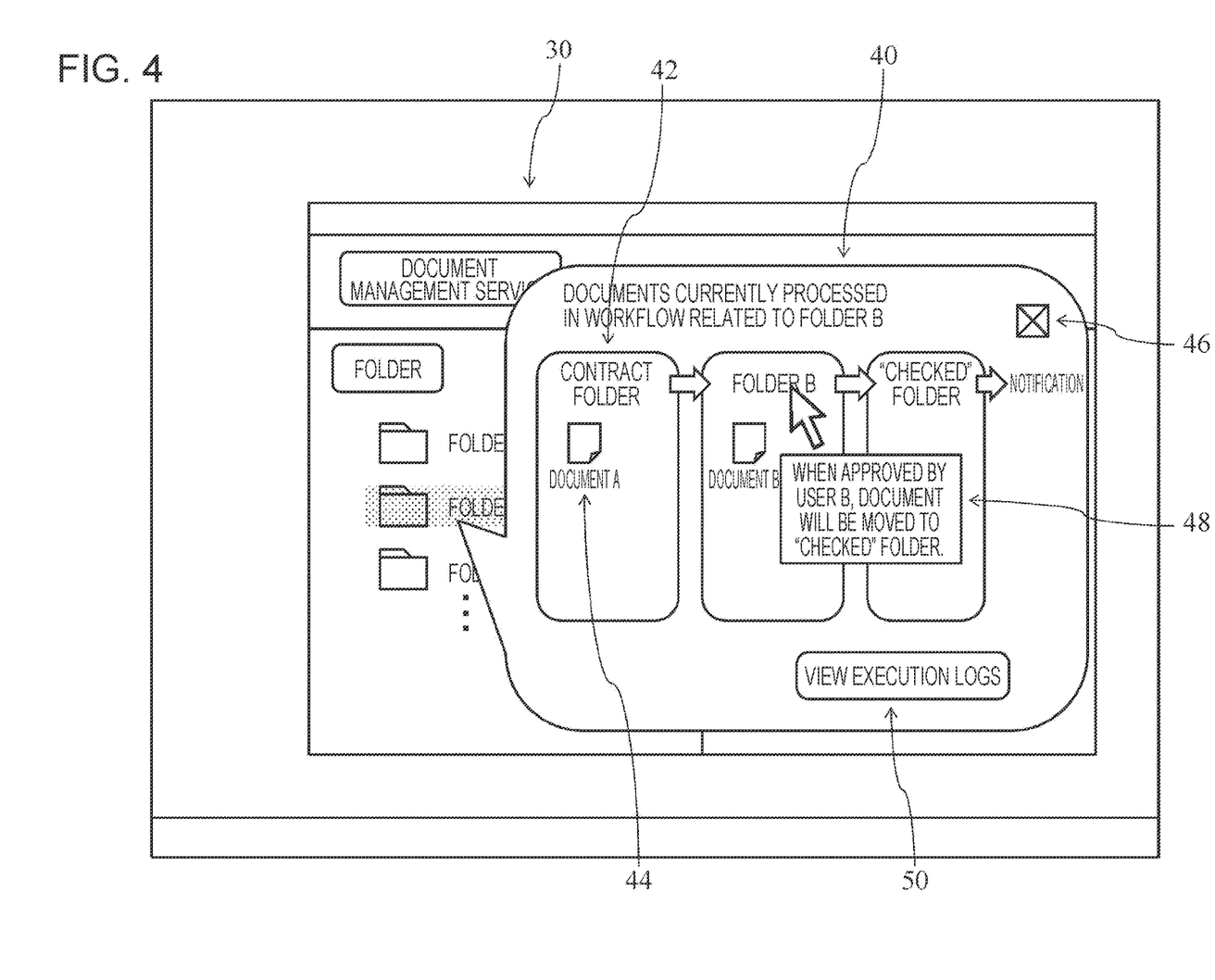
FIG. 4 illustrates an example of a status dialog.

FIG. 4 illustrates a display example of the status of the workflow. In this exemplary embodiment, the display controller 24 displays, as the status of the workflow, a status dialog 40 in the data management service window 30 to show the status of the workflow associated with the folder selected by the user (in the example of FIG. 3, the folder B).

In the status dialog 40 of this exemplary embodiment, the display controller 24 displays a correlation between the folder associated with the workflow and the electronic data stored in the folder. The display format of the status is not limited thereto. For example, the display controller 24 may display the status in the form of a table or a graph showing which process in the workflow has been completed on each piece of electronic data entered into the workflow.

Specifically, the display controller 24 of this exemplary embodiment displays folder objects 42 corresponding to one or more folders associated with the workflow in the status dialog 40. The folder objects 42 in the status dialog 40 include a folder object 42 corresponding to the folder selected by the user (in the example of FIG. 3, the folder B). The order of the processes in the workflow may clearly be shown by connecting the folder objects 42 by arrow objects.

The display controller 24 displays, in association with each folder object 42, a data icon 44 corresponding to the electronic data stored in the folder corresponding to the folder object 42. In this exemplary embodiment, the folder object 42 has a box shape, and the display controller 24 displays the data icon 44 corresponding to the electronic data stored in the folder corresponding to the folder object 42 within the box of the folder object 42. The user may grasp which electronic data is stored in each folder associated with the workflow, that is, the status of each piece of electronic data in the workflow.

If there is difficulty in simultaneously displaying a plurality of folder objects 42 in the status dialog 40 as in a case where many folders are associated with the workflow, the screen may be scrolled in the status dialog 40.

In this exemplary embodiment, the display controller 24 displays, in the status dialog 40, only the data icon 44 corresponding to the electronic data entered into the workflow by the user who has selected the folder. In other words, the display controller 24 does not display, in the status dialog 40, a data icon 44 corresponding to electronic data entered into the workflow by any other user. Specifically, the display controller 24 identifies the electronic data entered into the workflow by the user based on the information stored in the electronic data DB 18, and displays the data icon 44 corresponding to the identified electronic data in the status dialog 40. In the status dialog 40, the data icons 44 corresponding to pieces of electronic data entered into the workflow by all the users may be displayed. The user may switch the display of only the data icon 44 corresponding to the electronic data entered into the workflow by the user and the display of the data icons 44 corresponding to the pieces of electronic data entered into the workflow by all the users.

If the folder selected by the user is associated with a plurality of workflows, the display controller 24 may display the statuses of the plurality of workflows in the status dialog 40.

In this exemplary embodiment, the display controller 24 displays the status dialog 40 by placing the cursor on the folder icon 32 by a user's action. The user may view, regarding the folder on the screen as a reference point, the statuses of one or more workflows associated with the folder. When the user moves the cursor sequentially onto a plurality of folder icons 32, the status dialog 40 sequentially shows the statuses of the workflows associated with the respective folders.

The status dialog 40 includes a close button 46. The display controller 24 closes the status dialog 40 in response to a user's action on the close button 46.

If the user selects the folder object 42 by placing the cursor on the folder object 42 in the status dialog 40, the display controller 24 may display a processing operation box 48 indicating a processing operation associated with the folder corresponding to the folder object 42. The user may grasp the processing operation of each process in the workflow in the status dialog 40. Since the status dialog 40 may show the processing operation of each process in the workflow (including the folder associated with each process) and the order of the processes, the status dialog 40 may be regarded as showing the structure of the workflow.

The status dialog 40 includes a log viewing button 50. When the user operates the log viewing button 50, the display controller 24 displays, as the status of the workflow in the status dialog 40, processed electronic data that has previously been entered into the workflow and has been subjected to the processes in the workflow.

Figure 5:
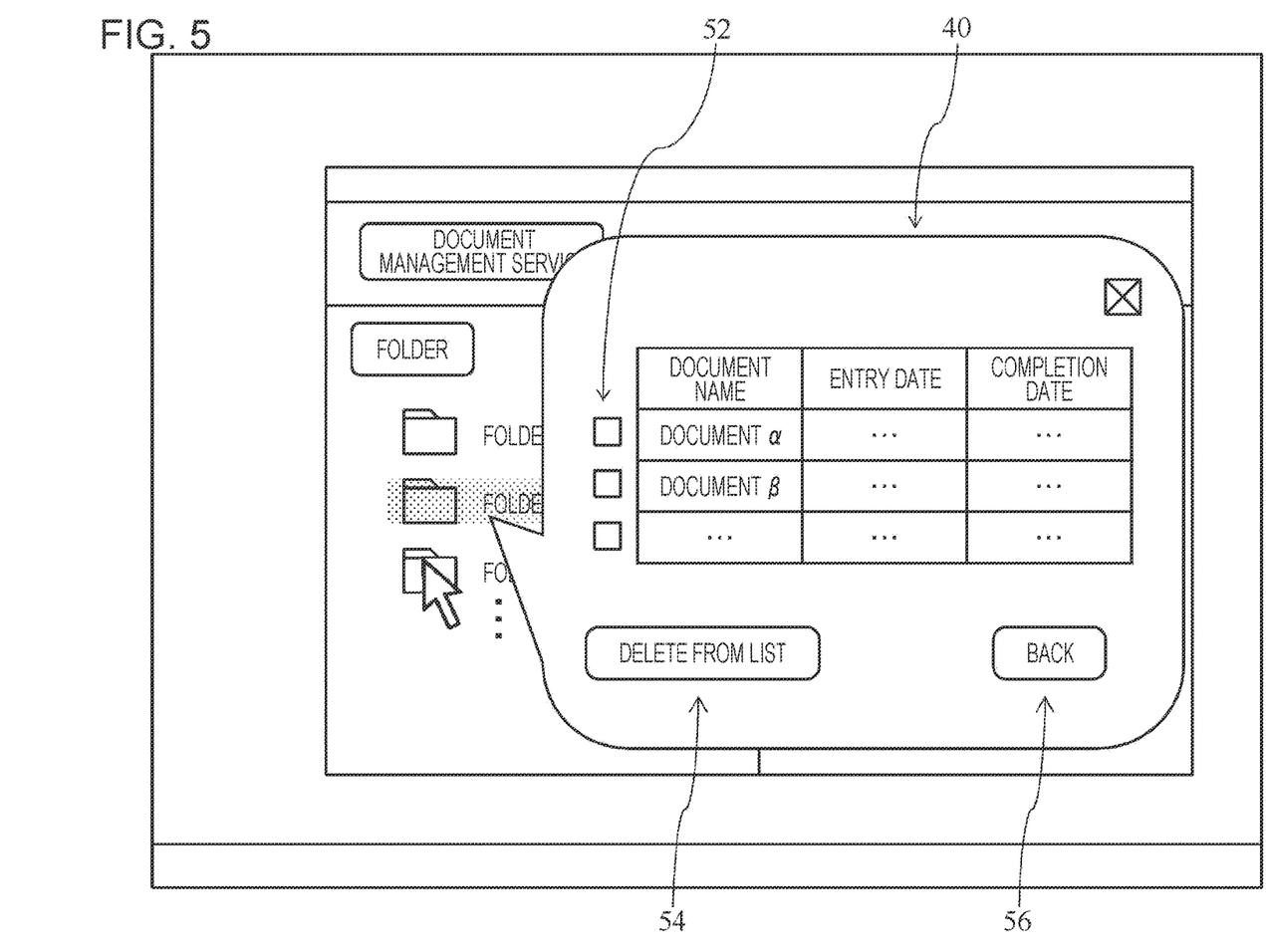
FIG. 5 illustrates a display example of processed data.

FIG. 5 illustrates a display example of the processed data. In the example of FIG. 5, a data name of each piece of processed data, a date of entry of the processed data into the workflow, and a date of completion of the processes in the workflow on the processed data are shown in the form of a table. The display example of the processed data is not limited thereto. In the example of FIG. 5, the display controller 24 displays deletion checkboxes 52 associated with the respective pieces of processed data, and a deletion button 54. When the user selects any deletion checkbox 52 and operates the deletion button 54, the processed data associated with the deletion checkbox 52 is no longer displayed. The display controller 24 displays a return button 56. When the user operates the return button 56, the display controller 24 displays the information illustrated in FIG. 4 in the status dialog 40 again.

Figure 6:
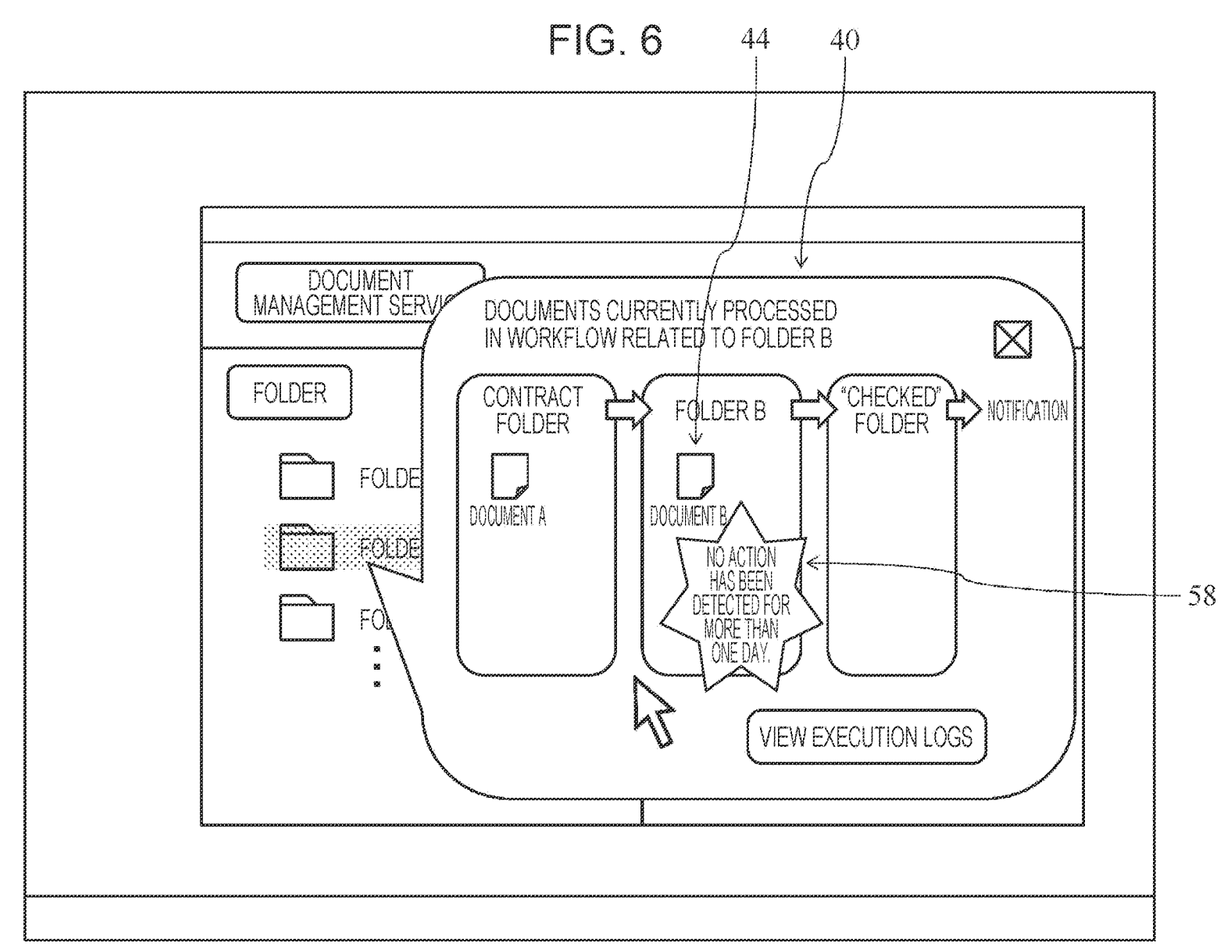
FIG. 6 illustrates a display example of an alert.

If the pieces of electronic data entered into the workflow associated with the folder selected by the user include electronic data whose process is stuck for a predetermined period or longer, the display controller 24 may display an alert about the electronic data in the status dialog 40. FIG. 6 illustrates a display example of the alert. For example, if the process on a document B in the workflow is stuck for the predetermined period or longer, the display controller 24 displays an alert object 58 indicating an alert near a data icon 44 corresponding to the document B.

Figure 7:
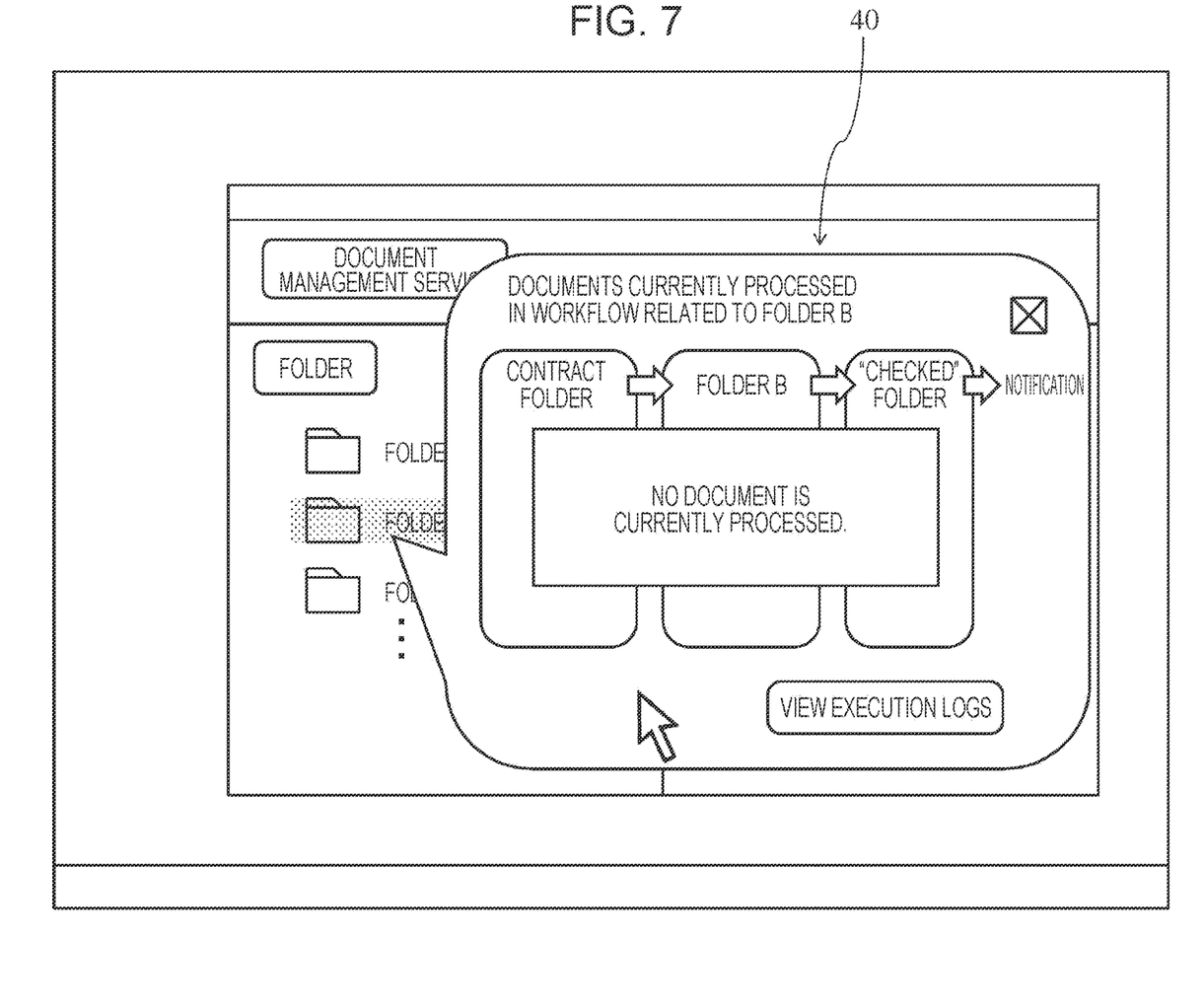
FIG. 7 illustrates a display example of a case where no electronic data is currently processed in the workflow.

The workflow associated with the folder selected by the user may have no currently processed electronic data. In other words, none of the folders associated with the workflow may store electronic data. In this case, the display controller 24 may display, as the status of the workflow in the status dialog 40, information indicating that the workflow has no currently processed electronic data. For example, as illustrated in FIG. 7, the display controller 24 displays a message "No document is currently processed." in the status dialog 40.

Figure 8:
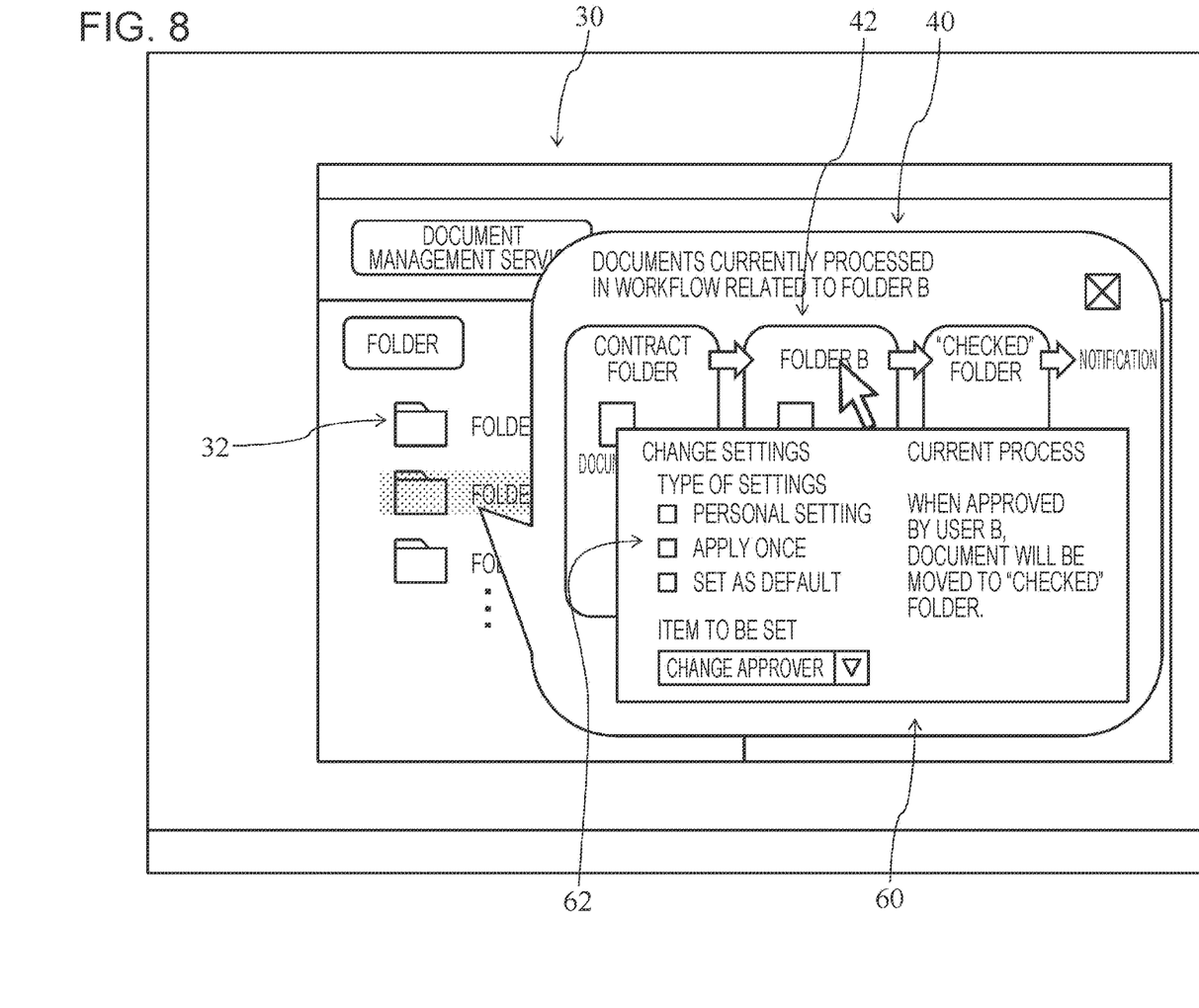
FIG. 8 illustrates an example of a setting change box.

The settings of the workflow may be changed by a user's action on the status dialog 40. In other words, the setting changer 26 may change the settings of the workflow (update the settings in the workflow DB 20) in response to the user's action on the status dialog 40. For example, if the user places the cursor on the folder object 42 displayed in the status dialog 40, the display controller 24 displays a setting change box 60 for the settings of the workflow in the status dialog 40 as illustrated in FIG. 8. The user may change the settings of the workflow by the action on the setting change box 60. Examples of the change of the settings of the workflow include, but not limited to, change of the processing operation of each process in the workflow, change of the folder associated with the process, and addition of a new process.

It may be inappropriate that the settings of the workflow changed in the setting change box 60 are applied to the processes on all the pieces of electronic data entered into the workflow. Therefore, the user may set a range of electronic data to which the changed settings of the workflow are applied. The settings of the workflow before the change by the user's action on the setting change box 60 are referred to herein as "pre-change settings", and the settings of the workflow after the change by the user's action on the setting change box 60 are referred to herein as "post-change settings". In the pieces of electronic data entered into the workflow, the electronic data to which the post-change settings are applied is referred to as "first electronic data", and the electronic data to which the pre-change settings are applied (in other words, the electronic data other than the first electronic data) is referred to as "second electronic data".

In this exemplary embodiment, the user may specify an application rule for determining the range of the first electronic data in the setting change box 60. For example, the display controller 24 displays the setting change box 60 including application rule checkboxes 62 to be used for specifying the application rule as illustrated in FIG. 8. In the example of FIG. 8, the setting change box 60 includes selective application rule checkboxes 62 indicating "Personal setting", "Apply once", and "Set as default".

For example, if the user changes the settings of the workflow with "Personal setting" selected in the application rule checkboxes 62, the range of the first electronic data to which the post-change settings are applied may be set to the electronic data entered into the workflow by the user. In other words, electronic data entered into the workflow by any other user is the second electronic data to which the pre-change settings are applied.

If the user changes the settings of the workflow with "Apply once" selected in the application rule checkboxes 62, the range of the first electronic data to which the post-change settings are applied may be set only to the electronic data currently entered into the workflow by the user. In other words, electronic data other than the electronic data currently selected by the user is the second electronic data to which the pre-change settings are applied.

If the user changes the settings of the workflow with "Set as default" selected in the application rule checkboxes 62, the range of the first electronic data to which the post-change settings are applied may be set to all the pieces of electronic data entered into the workflow. In this case, there is no second electronic data.

The above-mentioned application rules for determining the range of the first electronic data are examples, and various other application rules are conceivable. For example, the first electronic data may be a predetermined number of pieces of electronic data entered into the workflow, electronic data entered into the workflow within a predetermined period, or electronic data entered by a user belonging to a certain group.

When the user changes the settings of the workflow while specifying the application rule for determining the range of the first electronic data in the setting change box 60, the setting changer 26 newly stores the post-change settings in association with the workflow in the workflow DB 20 while keeping the pre-change settings associated with the workflow. The setting changer 26 also stores, in the workflow DB 20, the specified application rule and the user ID of the user in association with the workflow.

When the electronic data is entered into the workflow, the processing executor 22 refers to the workflow DB to determine whether the electronic data is the first electronic data or the second electronic data, in other words, whether to execute the workflow on the electronic data by applying the pre-change settings or the post-change settings.

In response to a user's action on the data icon 44 displayed in the status dialog 40, the process may be executed on the electronic data corresponding to the data icon 44. In other words, in response to the user's action on the data icon 44 displayed in the status dialog 40, the processing executor 22 may execute the process on the electronic data corresponding to the data icon 44.

Figure 9:
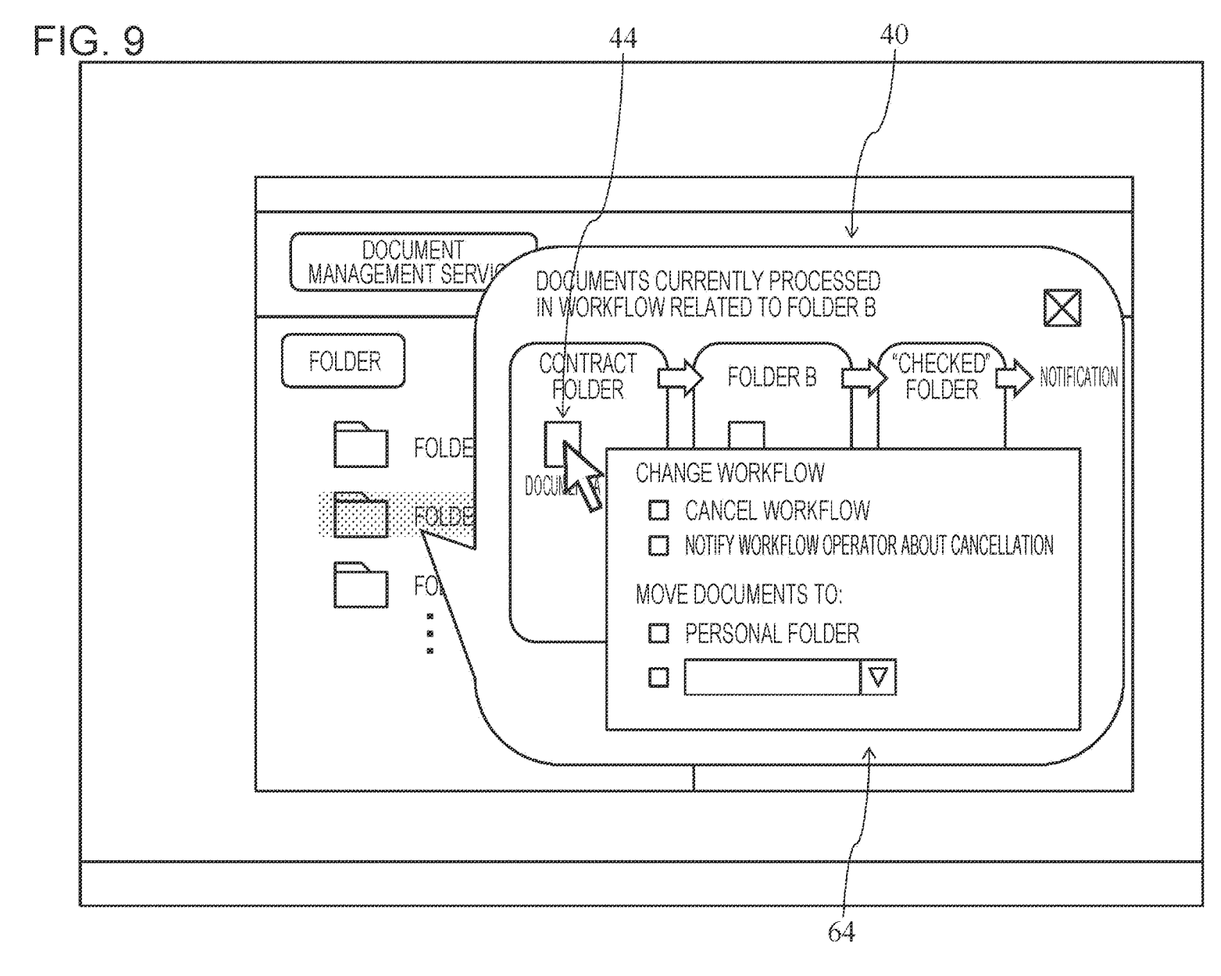
FIG. 9 illustrates an example of an action box.

For example, if the user places the cursor on the data icon 44 displayed in the status dialog 40, the display controller 24 displays an action box 64 in the status dialog 40 to give an instruction for the process on the electronic data corresponding to the data icon 44 as illustrated in FIG. 9. The user may change the settings of the workflow by the action on the action box 64. For example, by the action on the action box 64, the user may perform a process of deleting the electronic data from the workflow, a process of deleting the electronic data from the workflow and notifying the user who has entered the electronic data into the workflow, or a process of moving the electronic data to another folder in the workflow. The processes executable by the action on the action box 64 are not limited thereto.

When the user selects a folder, the user may specify a certain piece of electronic data. In this case, the user may want to enter the electronic data into a workflow associated with the folder without viewing the status associated with the folder.

Figure 10:
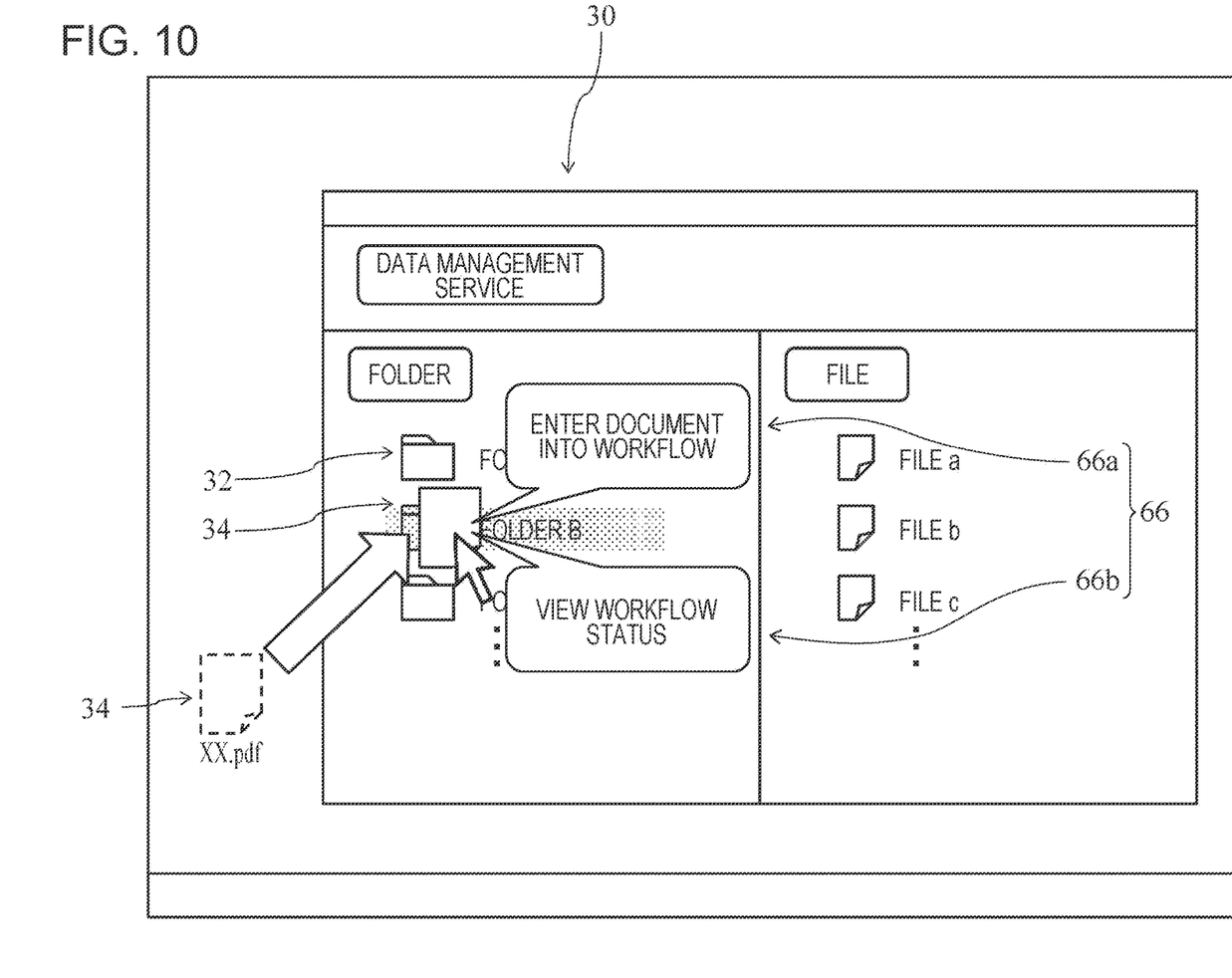
FIG. 10 illustrates an example of a selection dialog.

If the user selects the folder with the electronic data specified by the user, the display controller 24 may display, prior to the display of the status, a selection screen that prompts the user to choose whether to display the status of the workflow associated with the folder or to start the processes on the electronic data in accordance with the workflow.

For example, as illustrated in FIG. 10, the user drags a data icon 34 corresponding to electronic data (electronic data "XX.pdf") onto the folder icon 32 corresponding to the folder B. This action corresponds to selection of the folder B with the electronic data "XX.pdf" selected by the user. In response to this action, the display controller 24 displays a selection dialog 66 as the selection screen in the data management service window 30.

In this exemplary embodiment, the selection dialog 66 includes a data input button 66a and a status display button 66b. If the user selects (operates) the data input button 66a, the display controller 24 does not display the status dialog 40 and the processing executor 22 starts to execute the processes on the electronic data selected by the user in the workflow associated with the folder selected by the user. If the user selects (operates) the status display button 66b, the display controller 24 displays the status dialog 40.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
cause a display to display one or more folders associated with a workflow that predefines processing operations of a series of processes on electronic data, the one or more folders being associated with a process of the series of processes; and
cause the display to display a status of the workflow in response to selection of one of the one or more folders by a user.

2. The information processing apparatus according to claim 1, wherein the processor is configured to cause the display to display, as the status, a correlation between the one or more folders associated with the workflow and electronic data stored in the one or more folders.

3. The information processing apparatus according to claim 1, wherein the processor is configured to cause the display to display, as the status, information indicating that the workflow has no currently processed electronic data in response to none of the one or more folders associated with the workflow stores electronic data.

4. The information processing apparatus according to claim 2, wherein the electronic data is stored in the one or more folders associated with the workflow by the user.

5. The information processing apparatus according to claim 3, wherein the electronic data is stored in the one or more folders associated with the workflow by the user.

6. The information processing apparatus according to claim 2, wherein the processor is configured to cause the display to display, as the status, electronic data that has been processed in the workflow.

7. The information processing apparatus according to claim 1, wherein the processor is configured to change settings of the workflow in response to an action of the user on the status displayed on the display.

8. The information processing apparatus according to claim 2, wherein the processor is configured to process the electronic data in the correlation in response to an action of the user on a data icon corresponding to the electronic data.

9. The information processing apparatus according to claim 1, wherein the processor is configured to:
   in response to the one or more folders being selected with electronic data specified by the user, cause the display to display, prior to the display of the status, a selection screen that prompts the user to choose whether to display the status or to start a process on the electronic data in accordance with the workflow; and
   cause the display to display the status in response to the user choosing, on the selection screen, to display the status.

10. The information processing apparatus according to claim 1, wherein the processor is configured to cause the display to display the status when a cursor moving on a screen in response to an action of the user is placed on the one or more folders.

11. A non-transitory computer readable medium storing a program causing a computer to execute a process for information processing, the process comprising:

causing a display to display one or more folders associated with a workflow that predefines processing operations of a series of processes on electronic data, the one or more folders being associated with a process of the series of processes; and causing the display to display a status of the workflow in response to selection of one of the one or more folders by a user.

12. An information processing method comprising:

causing a display to display one or more folders associated with a workflow that predefines processing operations of a series of processes on electronic data, the one or more folders being associated with a process of the series of processes; and causing the display to display a status of the workflow in response to selection of one of the one or more folders by a user.

* * * * *